United States Patent
Liao (10) Patent No.: US 6,762,585 B2
(45) Date of Patent: Jul. 13, 2004

(54) COMBINATIONAL CHARGER APPARATUS

(76) Inventor: Sheng Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 0 days.

(21) Appl. No.: 10/151,147

(22) Filed: May 21, 2002

(65) Prior Publication Data

US 2003/0062873 A1 Apr. 3, 2003

(30) Foreign Application Priority Data

Oct. 3, 2001 (TW) .................................... 90216807 U (51) Int. Cl.[7] .................................................. H02J 7/00
(52) U.S. Cl. ............................................................ 320/107
(58) Field of Search ................................. 320/107, 109, 320/110, 112, 113, 114; 439/529, 527, 162, 163, 531, 534; 455/90, 575, 550, 569, 128, 345, 346, 347, 351, 348, 127, 572, 573, 99; 379/426, 433, 446, 455

(56) References Cited

U.S. PATENT DOCUMENTS

| | | | |
|---|---|---|---|
| 5,333,177 A | * | 7/1994 | Braitberg et al. ........... 379/441 |
| 5,479,479 A | * | 12/1995 | Braitberg et al. ....... 379/100.01 |
| 5,535,274 A | * | 7/1996 | Braitberg et al. ............ 379/426 |
| 5,708,707 A | * | 1/1998 | Halttunen et al. ........... 379/446 |
| 5,825,874 A | * | 10/1998 | Humphreys et al. ......... 379/446 |
| 5,839,919 A | * | 11/1998 | Chen ........................... 439/529 |
| 5,918,189 A | * | 6/1999 | Kivela .......................... 455/575 |
| 5,940,502 A | * | 8/1999 | Hirai et al. ................... 379/446 |
| 5,977,747 A | * | 11/1999 | Huang ........................... 320/107 |
| 5,982,149 A | * | 11/1999 | Shih ............................. 320/134 |
| 6,009,168 A | * | 12/1999 | Snyder et al. ............... 379/446 |
| 6,052,603 A | * | 4/2000 | Kinzalow et al. ............ 455/557 |
| 6,138,041 A | * | 10/2000 | Yahia ........................... 455/569 |
| 6,249,107 B1 | * | 6/2001 | Wolfe et al. ................. 320/150 |
| 6,341,218 B1 | * | 1/2002 | Poplawsky et al. ............ 455/90 |

* cited by examiner

*Primary Examiner*—Pia Tibbits
(74) *Attorney, Agent, or Firm*—Rosenberg, Klein & Lee (57) ABSTRACT

A fast combinational charger includes a shell body, a circuit unit, and a combinational module. The shell body has a bearing seat at the outer side. The circuit unit is disposed in the shell body, and has a first connector. The combinational module includes a module shell body and a module circuit board. The module circuit board is disposed in the module shell body. The module circuit board has terminals protruding out of the module shell body. The combinational module can be placed on the bearing seat. The module circuit board can be connected with the first connector to achieve electric connection with the circuit unit.

10 Claims, 9 Drawing Sheets

FIG. 9 ced description when read in conjunction with the
COMBINATIONAL CHARGER APPARATUS

FIELD OF THE INVENTION

The present invention relates to a fast combinational charger and, more particularly, to a charger having both the functions of a placement seat and a common charger and also having the transmission function of communications, wherein different combinational modules can be quickly replaced according to different types of portable electronic devices such as mobile phones and personal digital assistants.

BACKGROUND OF THE INVENTION

Figure 1:
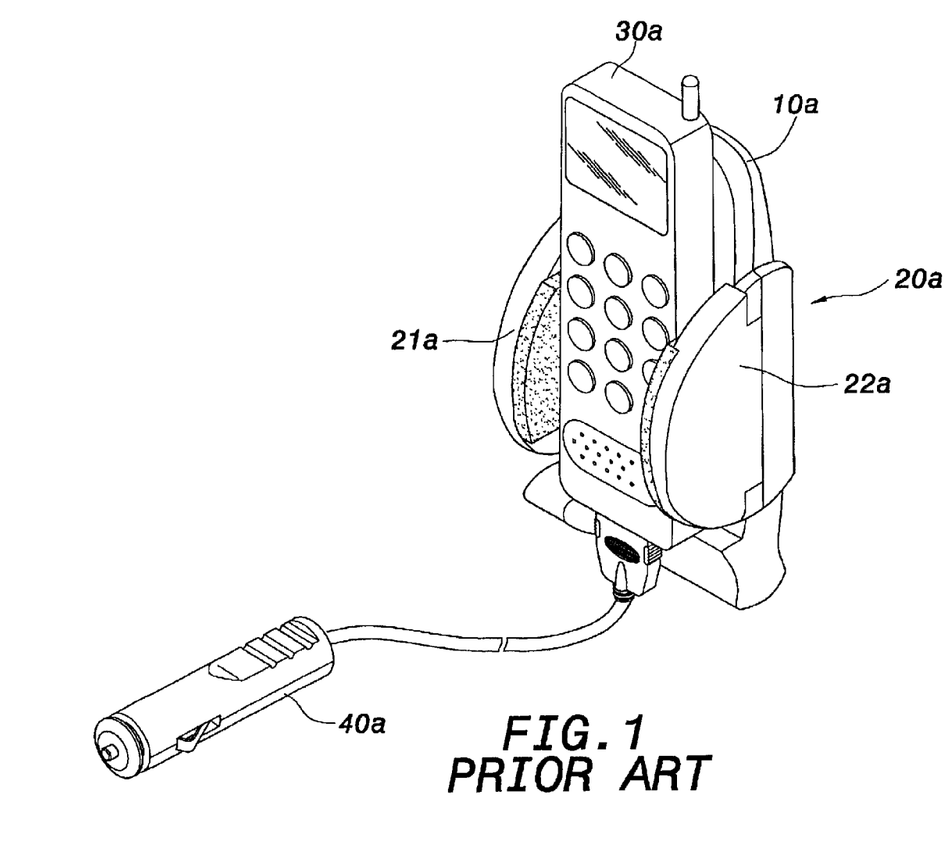
FIG. 1 is a perspective view of a mobile phone placement seat in the prior art.

As shown in FIG. 1, a conventional mobile phone placement seat comprises a shell body 10a and a clamping mechanism 20a. The clamping mechanism 20a is composed of a fixing and clamping piece 21a and a mobile clamping piece 22a. The mobile clamping piece 22a can move horizontally so as to clamp and fix a mobile phone 30a placed between the two clamping pieces 21a and 22a. The mobile phone 30a can plug with an appropriate plug 40a, which can then be inserted into a car lighter for appropriate power input so as to provide the required power electricity for the mobile phone 30a or charge the battery of the mobile phone 30a.

However, the above mobile phone placement seat can only provide the single placement function for a mobile phone, but cannot provide the charging function. The external plug 40a is also required for the charging operation.

Although chargers have been provided in the market for charging mobile phones, a conventional charger is only applicable to the same type of mobile phones. Because these kinds of chargers cannot apply to different types of mobile phones, the usage thereof is this less flexible. Usually, it is necessary to replace the whole mobile phone charger to match a different mobile phone. In addition to increasing economic burdens to users, the production cost is much raised for manufacturers.

Accordingly, the above conventional mobile phone placement seat and charger have inconvenience and drawbacks in practical use. The present invention aims to resolve the problems in the prior art.

SUMMARY OF THE INVENTION

The primary object of the present invention is to provide a fast combinational charger, wherein different combinational modules can be replaced according to different types of portable electronic devices such as mobile phones and personal digital assistants. The combinational modules can be fast assembled with a shell body and a circuit unit to have a more flexible and wider usage. It is not necessary to replace the whole charger to match a different portable electronic device, hence lessening economic burdens to users and greatly lowering the production cost.

Another object of the present invention is to provide a fast combinational charger having both the functions of a placement seat and a common charger for portable electronic devices such as mobile phones and personal digital assistants. Moreover, two clamping pieces of a clamping mechanism thereof can clamp and fix a portable electronic device so that the electronic portable device cannot move, and contact terminals of the electronic portable device can exactly contact with contact terminals of the charger.

To achieve the above objects, the present invention provides a fast combinational charger, which comprises a shell body, a circuit unit, and a combinational module. The shell body has a receiving space therein and a bearing seat at the outer side thereof. The circuit unit is disposed in the receiving space, and has a first connector. The combinational module is composed of a module shell body and a module circuit board. The module circuit board is disposed in the module shell body. The module circuit board has terminals thereon protruding out of the module shell body. The combinational module can be placed on the bearing seat. The module circuit board can be connected with the first connector to achieve electric connection with the circuit unit. A fast combinational charger is thus formed.

The various objects and advantages of the present invention will be more readily understood from the following detailed description when read in conjunction with the appended drawing, in which:

DETAILED DESCRIPTION OF THE PREFERRED EMBODIMENTS

Figure 2:
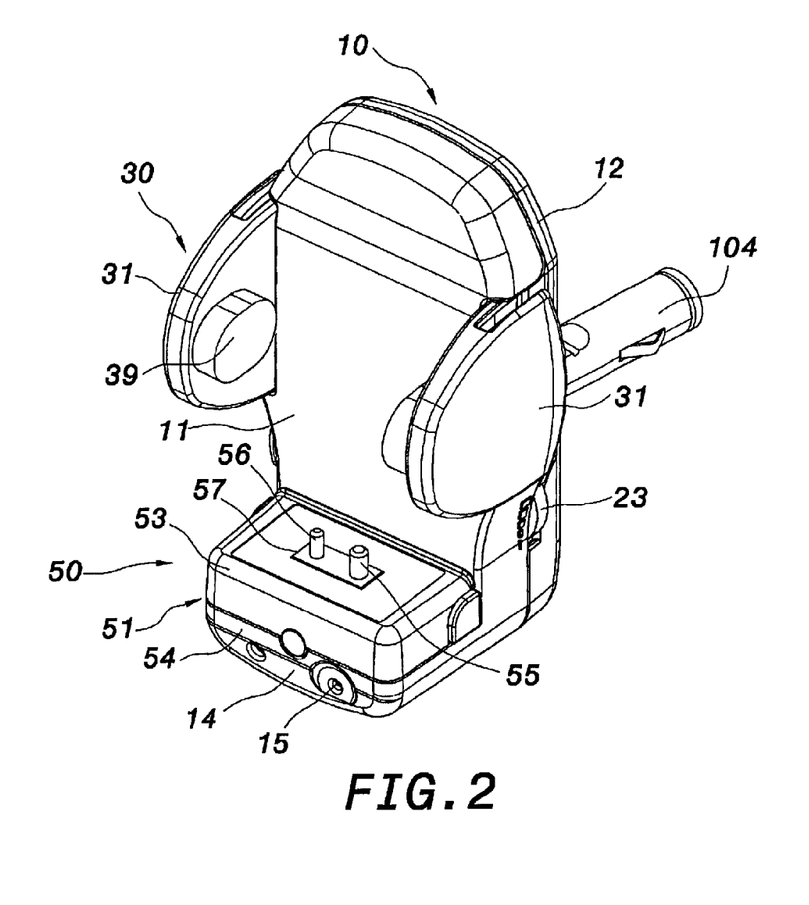
FIG. 2 is a perspective assembly view according to a first embodiment of the present invention.
Figure 3:
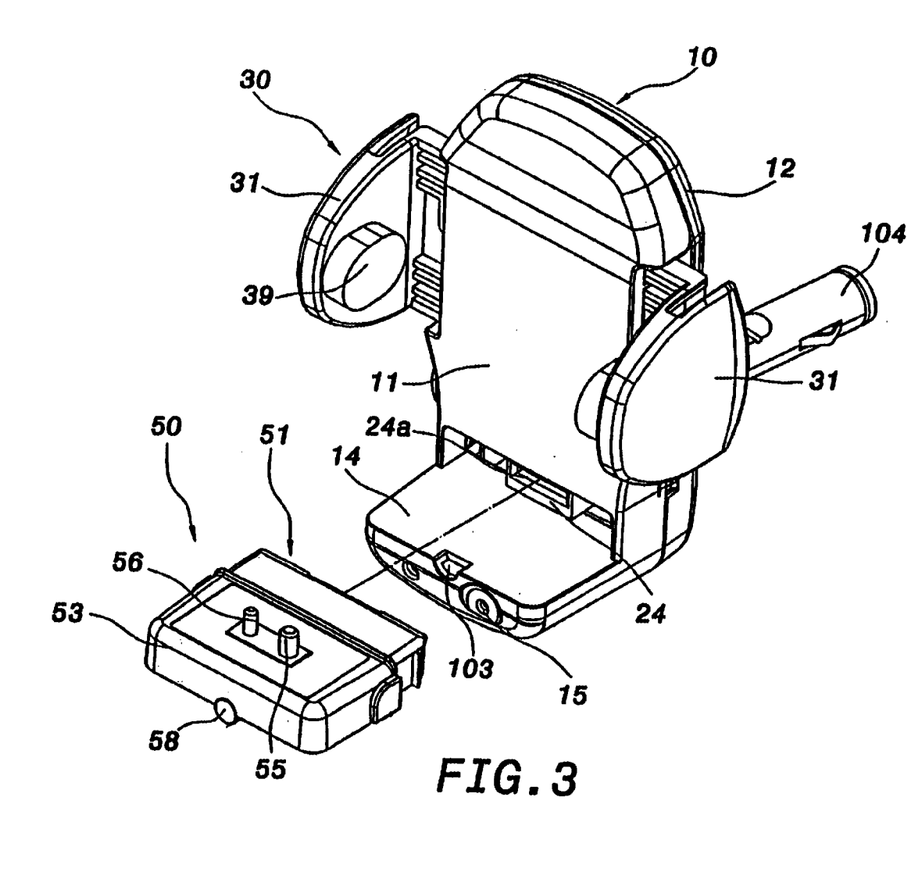
FIG. 3 is an exploded perspective view according to the first embodiment of the present invention.
Figure 4:
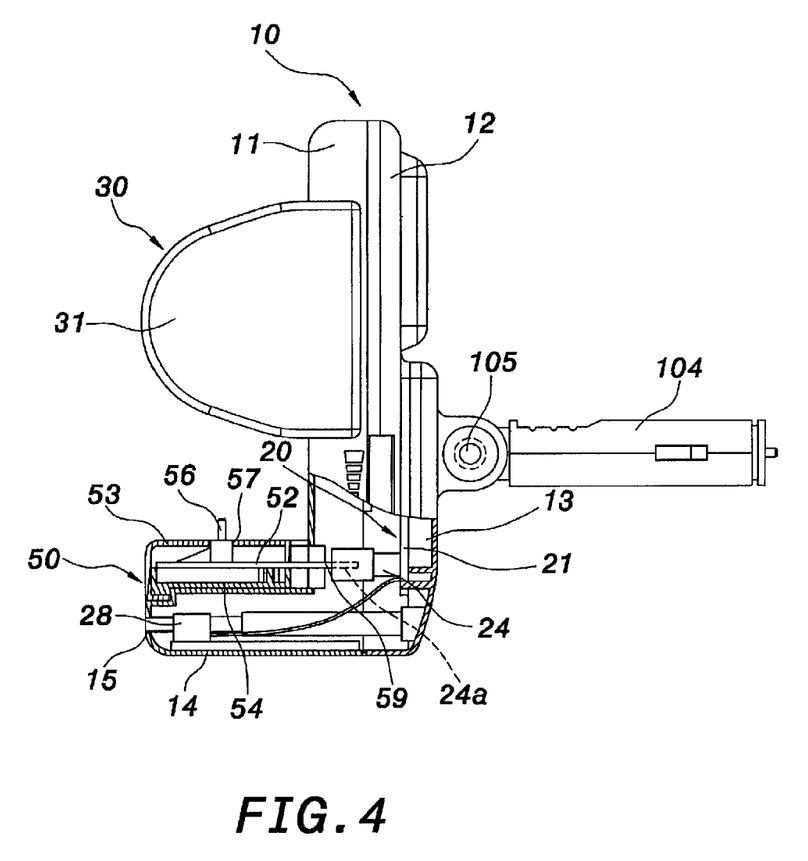
FIG. 4 is a cross-sectional view according to the first embodiment of the present invention.

As shown in FIGS. 2, 3, and 4, the present invention provides a fast combinational charger comprising a shell body 10, a circuit unit 20, a clamping mechanism 30, and a combinational module 50. The shell body 10 is formed by combining a front shell 11 and a rear shell 12. The shell body 10 has a receiving space 13 therein for receiving the circuit unit 20 and the clamping mechanism 30. The front shell 11 has an L-shaped side view. The front shell 11 has a forwardly extending bearing seat 14 at the outer side thereof. The bearing scat 14 Is horizontal, and can be used to bear the combinational module 50. A circular through bale 15 can be formed at the front side of the bearing seat 14. The front shell 11 and the rear shell 12 are joined together by screwing, retaining, or supersonic welding. The hollow shell body 10 is thus formed.

The circuit unit 20 is composed of a circuit board 21, an adjustment knob 23, a first connector 24, and a loudspeaker (not shown). The adjustment knob 23, the first connector 24, and the loudspeaker are soldered and electrically connected to the circuit board 21. The adjustment knob 23 can be used to adjust the sound volume. The circuit unit 20 is disposed and properly fixed in the receiving space 13. The first connector 24 is exposed at the front side of the front shell 11 of the shell body 10 to achieve electric connection with the combinational module 50. The circuit unit 20 has also the transmission function of communications.

A microphone 28 is further disposed in the bearing seat 14 of the shell body 10. The microphone 28 corresponds to the through hole 15 at the front side of the bearing seat 14, and is used to collect external sound. The microphone 28 is properly connected to the circuit board 21 with conducting wires to achieve electric connection with the circuit board 21.

A screw 105 used as a pivot is disposed at the rear side of the rear shell 12 of the shell body 10 to pivotally connect a second connector 104. The second connector 104 can be turned to show different angles with the screw 105 as an axis so as to make the perfect adjustment according to necessity. The second connector 104 is electrically connected to the circuit board 21 of the circuit unit 20 with conducting wires (not shown). The second connector 104 can then be inserted into a car lighter for appropriate power input.

The clamping mechanism 30 is composed of two clamping pieces 31. The clamping piece 31 has an L-shaped top view. The two clamping pieces 31 are left and right disposed at two sides of the shell body 10. One end of each of the clamping pieces 31 is inserted into the shell body 10. One end of each of the clamping pieces 31 is slidably matched with the shell body 10 to make horizontal motion. A spacer 39 made of elastic material like rubber can be fixedly disposed at the inside of the other side of each of the clamping pieces 31 by means of gluing. One can push the two clamping pieces 31 to move inwards to make clamping action so as to clamp and fix a mobile phone 70 placed between the two clamping pieces 31, as shown in FIG. 5 so that the mobile phone 70 can be firmly fixed on the shell body 10 and the combinational module 50.

Figure 8:
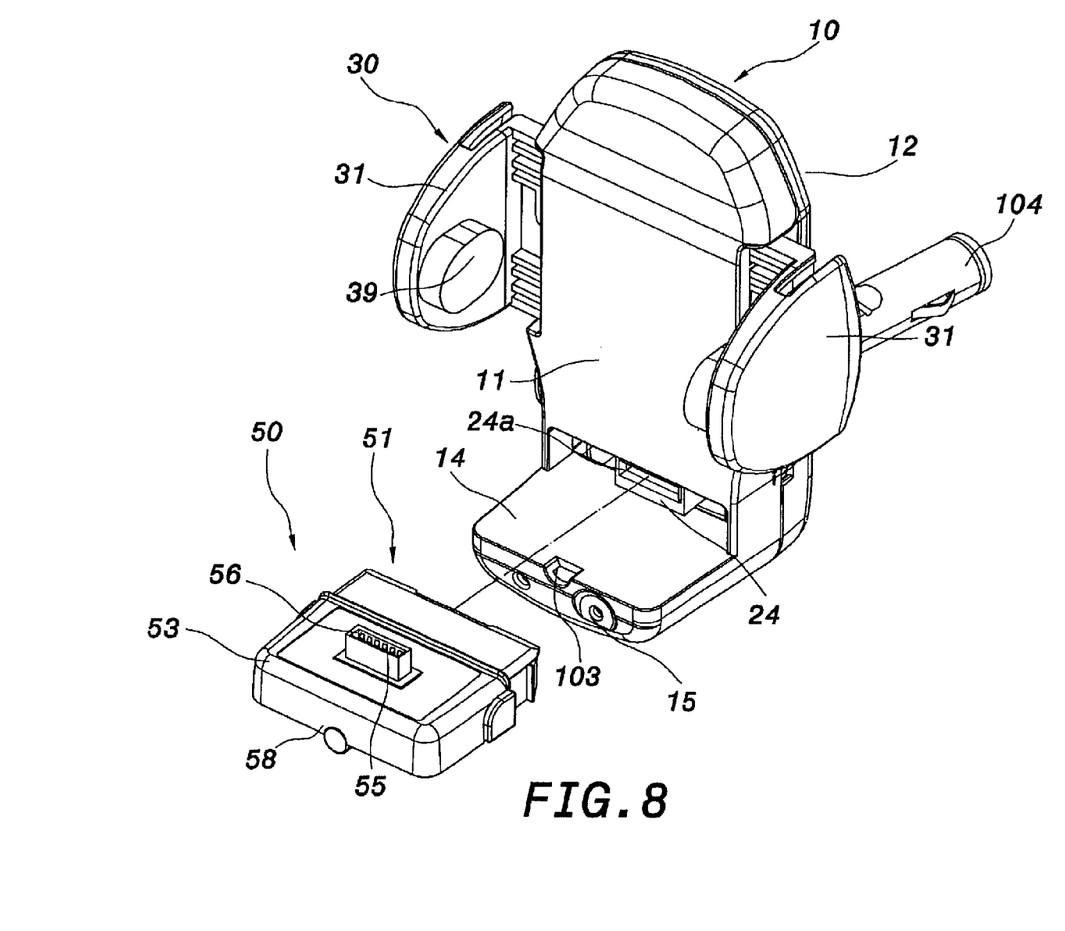
FIG. 8 is an exploded perspective view according to a fourth embodiment of the present invention.

The combinational module 50 is made of a module shell body 51 and a module circuit board 52. The module shell body 51 is formed by connecting an upper shell 53 and a lower shell 54. The upper shell 53 and the lower shell 54 are joined together by screwing, retaining, or supersonic welding. The hollow module shell body 51 is thus formed. The module circuit board 52 is fixedly disposed in the module shell body 51. The module circuit board 52 has at least a signal terminal 55, a power source contact terminal 56, and a contact circuit 59 thereon. The signal terminal 55 and the power source contact terminal 56 protrude out of the top of the module shell body 51 via an opening 57 preset on the upper shell 53. The signal terminal 55 and the power source contact terminal 56 can be designed in different types according to different mobile phones, as shown in FIG. 8.

The combinational module 50 can be placed on the bearing seat 14. A positioning body 58 and a positioning hole 103 can be disposed between the combinational module 40 and the bearing seat 14 to match and position each other. One end of the module circuit board 52 can be inserted into a insertion hole 24a of the first connector 24 via the contact circuit 59 to let the module circuit board 52 achieve electric connection with the circuit board 21 of the circuit unit 20. A fast combinational charger of the present invention is thus formed.

Figure 5:
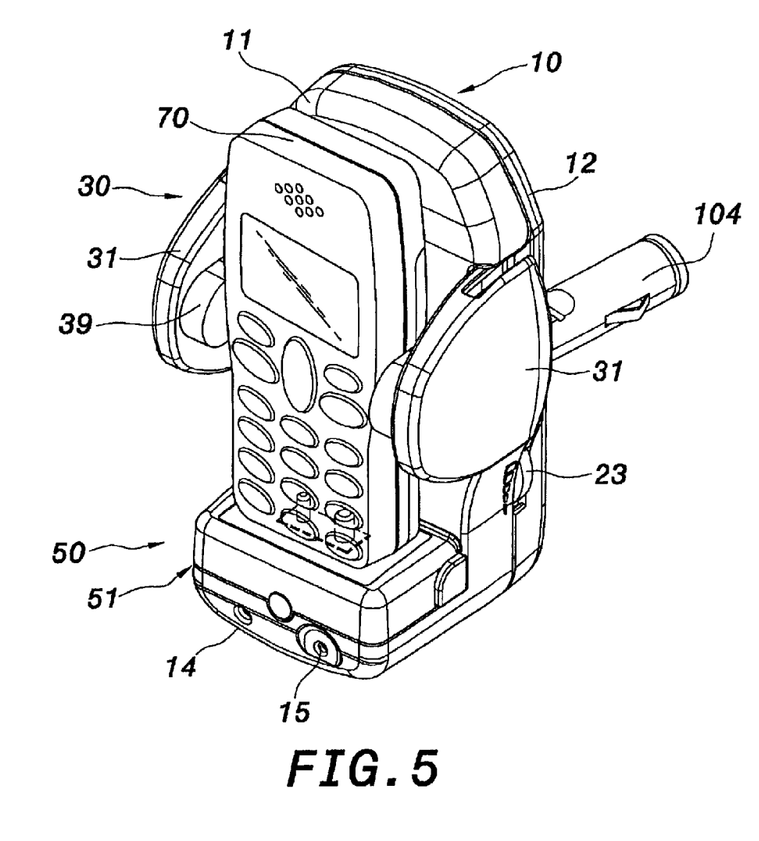
FIG. 5 is a use state diagram according to the first embodiment of the present invention.

Please refer to FIG. 5. The mobile phone 70 can be placed on the combinational module 50, which achieve electric connection with terminals (not shown) of the mobile phone 70 via the signal terminal 55 and the power source contact terminal 56. The two clamping pieces 31 can clamp two sides of the mobile phone 70 to firmly position it. The second connector 104 can be inserted into a car lighter for appropriate transmission of power and signal. Electricity and signals can be transferred to the circuit unit 20 and the module circuit board 52 so that the power source contact terminal 56 can charge the mobile phone 70.

Please refer to FIG. 3 again. The combinational module 50 is joined with the shell body 10 and the circuit unit 20 in combinational way. The combinational module 50 is separate unit, and adopts a replaceable design. Different types of combinational modules 50 can be replaced according to mobile phones of different types and specifications, as shown in FIG. 8. The module circuit board 52 can be connected with the first connector 24 so that the combinational module 50 can be fast assembled with the shell body 10 and the circuit unit 20. The combinational module 50 can also be easily detached and replaced to have a more flexible and wider usage. It is not necessary to replace the whole mobile phone charger to match different types of mobile phones. Therefore, economic burdens to users can be effectively lessened. Moreover, because the shell body 10 and the circuit unit 20 are in common use, and it is only necessary to design different combinational modules 50, the production cost is greatly lowered.

Figure 6:
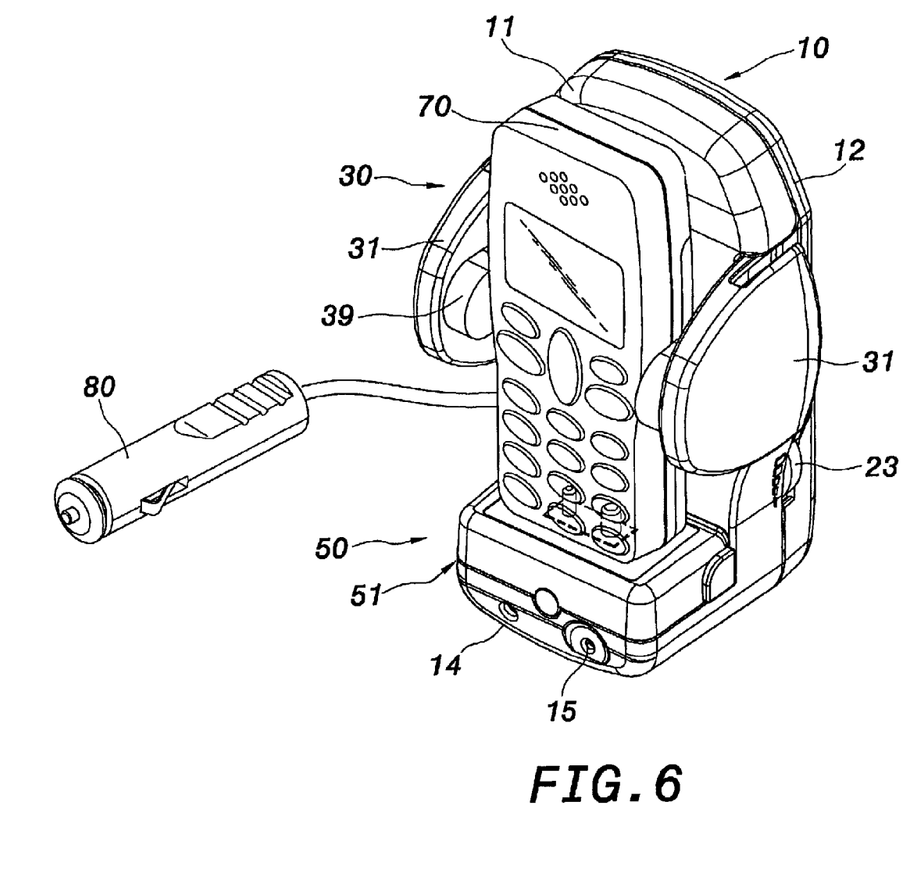
FIG. 6 is a use state diagram according to a second embodiment of the present invention.
Figure 7:
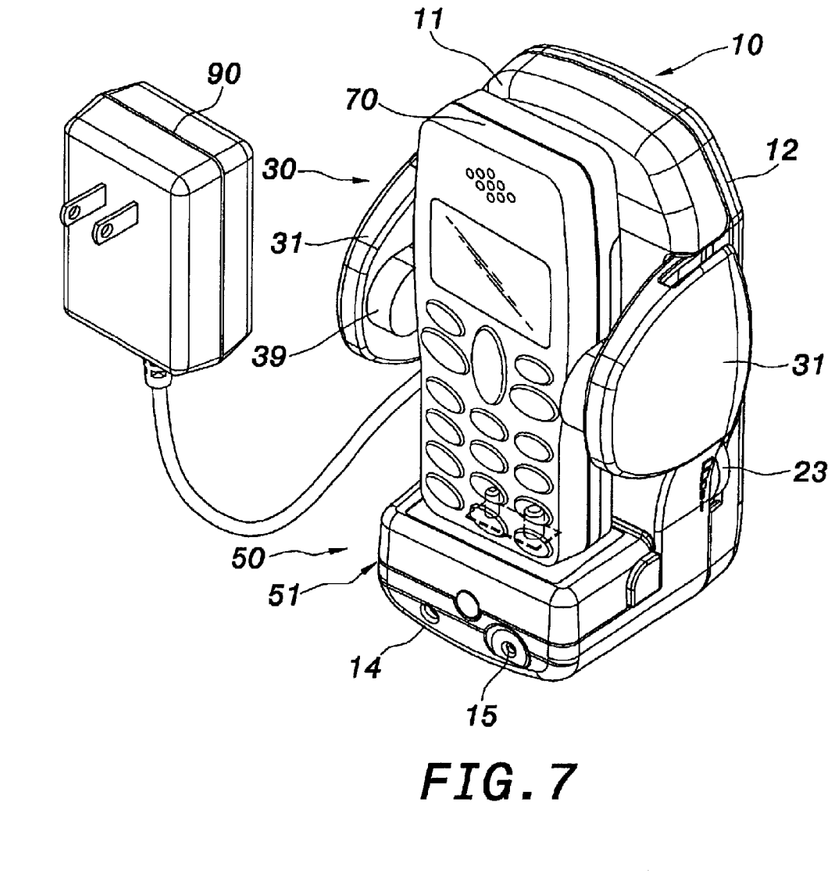
FIG. 7 is a use state diagram according to a third embodiment of the present invention.

Please refer to FIGS. 6 and 7. The second connector 104 can also be saved. Instead, the circuit board 21 of the circuit unit 20 is connected to an appropriate plug 80 or 90 via conducting wires so as to be inserted into an appropriate power source like a car lighter or a common socket. Electricity can be transferred to the circuit unit 20 and the module circuit board 52 so that the power source contact terminal 56 can charge the mobile phone 70. Therefore, the present invention has both the functions of a mobile phone placement seat and a common charger.

Figure 9:
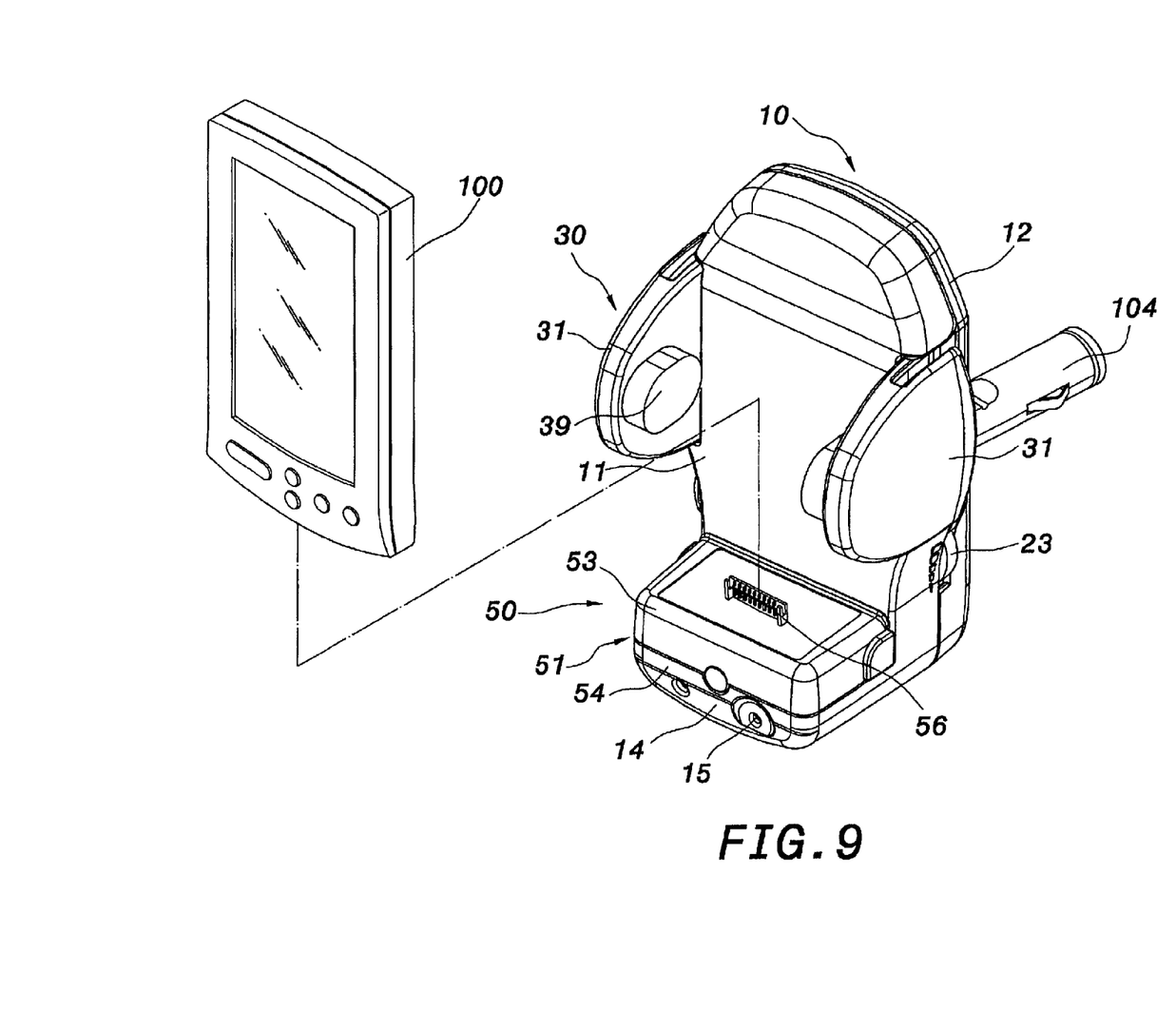
FIG. 9 is a use state diagram according to a fifth embodiment of the present invention.

Please refer to FIG. 9. The present invention can also apply to portable electronic devices like a personal digital assistant (PDA). The PDA 100 can be placed on the combinational module 50, which achieves electric connection with terminals (not shown) of the PDA 100 via the power source contact terminal 56. The two clamping pieces 31 are used to clamp two sides of the PDA 100 to firmly position it. The second connector 104 can be inserted into a car lighter for appropriate power input. Electricity can be transferred to the circuit unit 20 and the module circuit board 52 so that the power source contact terminal 56 can charge the PDA 100.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A fast combinational charger for a wireless electronic device comprising:

a shell body defining an internal receiving space and having a bearing seat extending from an outer side thereof, said bearing seat having a positioning hole portion formed thereon;

at least a pair of opposed clamping members adjustably coupled to said shell body for capturing the wireless electronic device therebetween in adaptive manner;

a circuit unit disposed in said receiving space and having a first connector accessible through said shell body; and at least one combinational module supported on said shell bearing seat and detachably coupled to said first connector to be replaceably docked on said shell body, said combinational module including a module shell body and a module circuit board disposed therein, said module circuit boards having terminals protruding out of said module shell body for detachable connection to the wireless electronic device upon the captive placement thereof between said clamping members, said module shell body having formed thereon a positioning body portion engaging said positioning hole portion of said shell body to guide the alignment of said module shell body and said shell body one relative to the other.

2. The fast combinational charger as claimed in claim 1, wherein said shell body is formed by combining a front shell and a rear shell.

3. The fast combinational charger as claimed in claim 1, wherein a microphone is disposed in said bearing seat of said shell body, and a through hole corresponding to said microphone is formed at a front side of said bearing seat, and said microphone is electrically connected to said circuit unit.

4. The fast combinational charger as claimed in claim 1, wherein a second connector is pivotally joined with said shell body, and said second connector is electrically connected to said circuit unit.

5. The fast combinational charger as claimed in claim 1, wherein a said clamping mechanism is disposed at the left and right sides of said shell body.

6. The fast combinational charger as claimed in claim 5, wherein said clamping mechanism comprises two clamping pieces disposed at left and right sides of said shell body respectively, and one end of each of said clamping pieces is inserted into said shell body horizontal adjustment relative thereto.

7. The fast combinational charger as claimed in claim 6, wherein a spacer made of elastic material is disposed at an inner side of each of said two clamping pieces of said clamping mechanism.

8. The fast combinational charger as claimed in claim 1, wherein said module shell body of said combinational module is formed by combining an upper shell and a lower shell, and said terminals of said combinational module protrude out of a top of said module shell body via an opening preset on said upper shell.

9. The fast combinational charger as claimed in claim 1, wherein said terminals of said combinational module include a signal terminal and a power source contact terminal.

10. The fast combinational charger as claimed in claim 1, wherein said circuit unit includes a circuit board and an adjustment knob coupled thereto, said adjustment knob being accessible through said shell body.

\* \* \* \* \*